No. 733,836. PATENTED JULY 14, 1903.
A. E. HALL & W. G. SMITH.
FISHING ROD.
APPLICATION FILED FEB. 7, 1903.
NO MODEL. 2 SHEETS—SHEET 1.
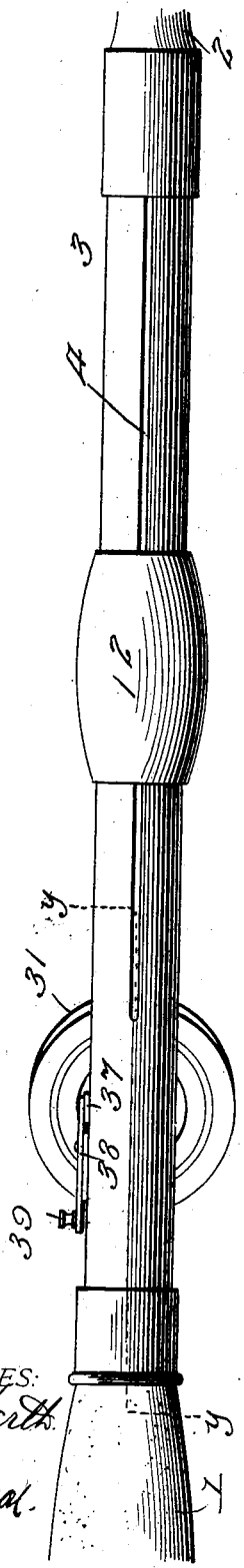
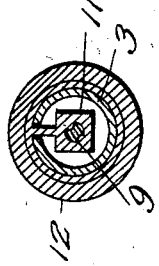
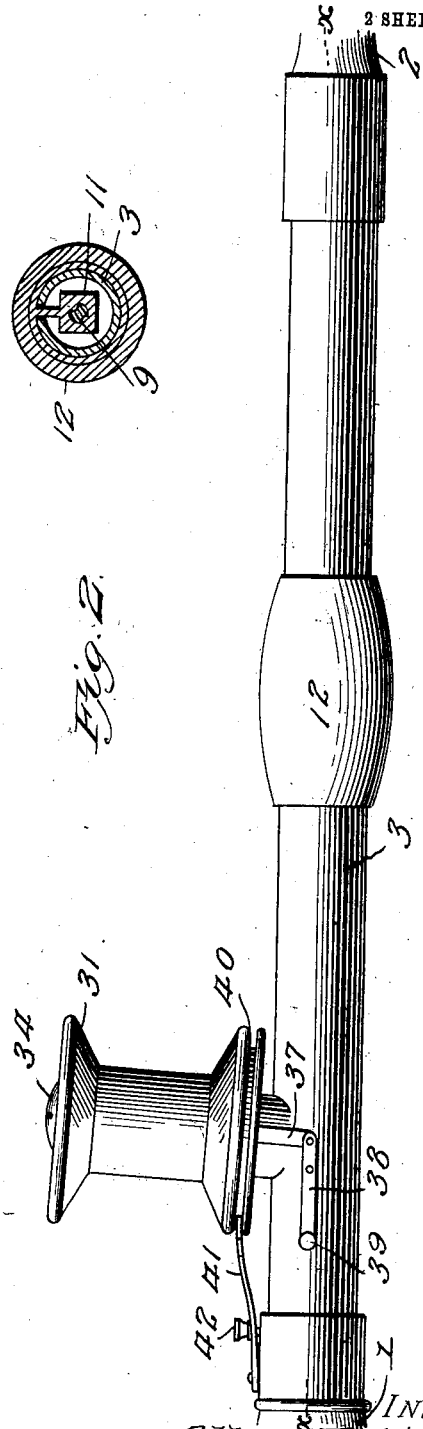
WITNESSES:
INVENTORS
Allen E. Hall,
BY William G. Smith,
Victor J. Evans
Attorney No. 733,836. PATENTED JULY 14, 1903.
A. E. HALL & W. G. SMITH.
FISHING ROD.
APPLICATION FILED FEB. 7, 1903.
NO MODEL. 2 SHEETS—SHEET 2.
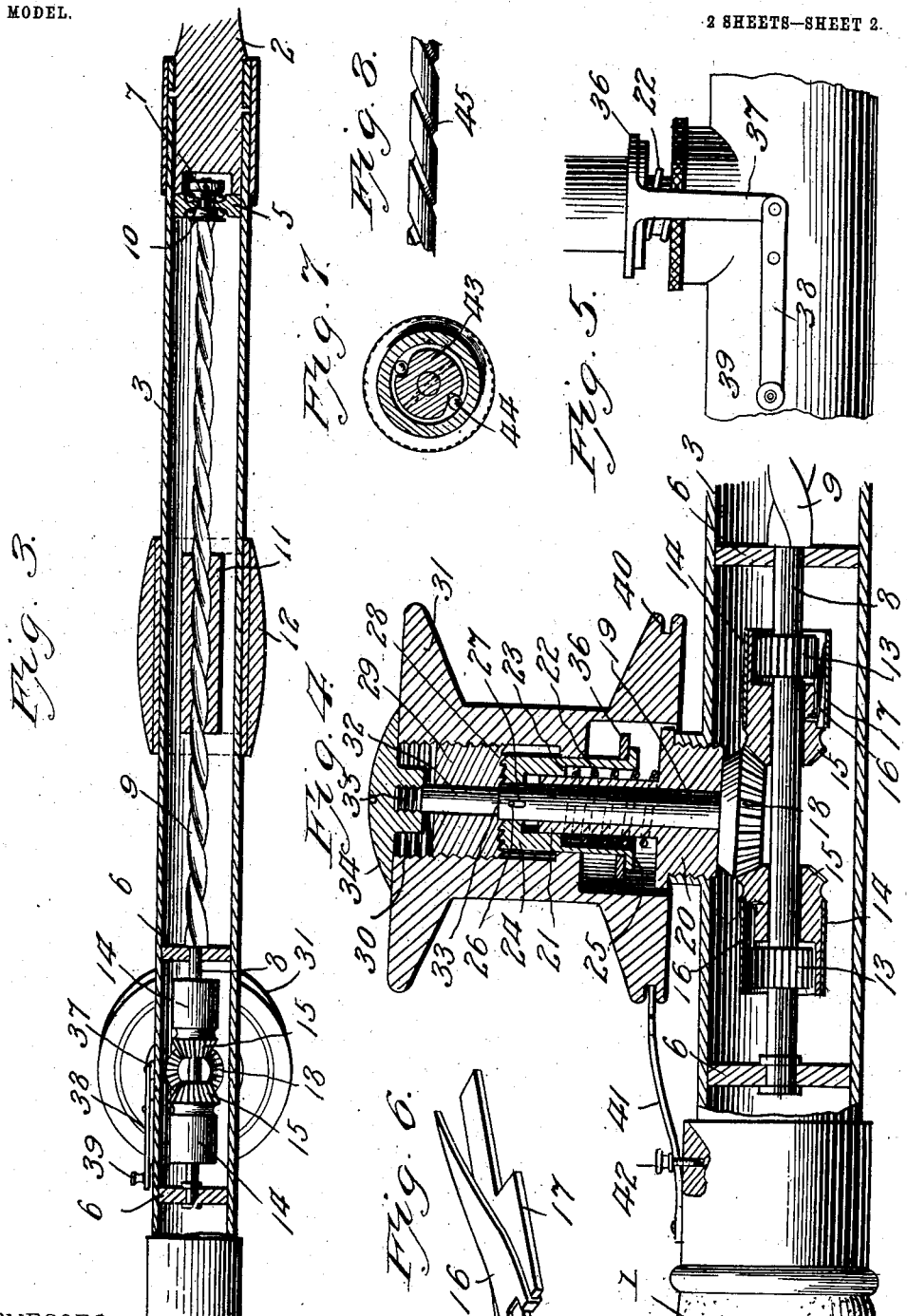
WITNESSES:
INVENTORS
Attorney No. 733,836. Patented July 14, 1903.

UNITED STATES PATENT OFFICE.

ALLEN E. HALL AND WILLIAM G. SMITH, OF PHILADELPHIA, PENNSYLVANIA.

FISHING-ROD.

SPECIFICATION forming part of Letters Patent No. 733,836, dated July 14, 1903.

Application filed February 7, 1903. Serial No. 142,365. (No model.)

*To all whom it may concern:*

Be it known that we, ALLEN E. HALL and WILLIAM G. SMITH, citizens of the United States, residing at Philadelphia, in the county of Philadelphia and State of Pennsylvania, have invented new and useful Improvements in Fishing-Rods, of which the following is a specification.

Our invention relates to new and useful improvements in fishing-rods, and more particularly to the reel and the mechanism for rotating the same.

The object of the invention is to provide a reel having mechanism whereby the same may be continuously rotated by reciprocating a sleeve which is slidably mounted upon the rod.

A further object is to employ means for quickly releasing the reel from its operating mechanism to permit the same to revolve freely.

A further object is to employ a drag of simple construction by means of which rotation of the reel may be retarded at will.

With the above and other objects in view the invention consists in arranging a tubular casing with the handle of the fishing-rod at one end thereof and the rod proper extending from the other end thereof. Within this casing is journaled a screw-shaft, upon which is mounted a block which extends through a slot in said tubular casing and is connected to or integral with a sleeve inclosing said casing. Beveled gears are oppositely disposed upon the shaft and are connected thereto by means of pawl-and-ratchet mechanism, whereby when the shaft is turned in one direction but one of the gears is rotated therewith, the other gear being free to turn in the opposite direction. Both of these gears mesh with a beveled gear which is secured to the inner end of a laterally-extending shaft having a reel thereon. A clutch of peculiar form is arranged within the reel and is adapted to be operated by means of a lever located upon the outside of the casing adjacent to the handle. By means of this lever the reel may be readily thrown into or out of operative relation with its shaft.

The invention also consists in the further novel construction and combination of parts, which will be more fully described and claimed, and illustrated in the accompanying drawings, in which—

Figure 1 is a side elevation of a portion of a fishing-rod having our improved reel thereon. Fig. 2 is a plan view thereof. Fig. 3 is a section on line $x\ x$, Fig. 2. Fig. 4 is an enlarged section on the line $y\ y$, Fig. 1. Fig. 5 is an enlarged detail view showing the clutch-operating mechanism. Fig. 6 is a perspective view of a pawl used in connection with the loosely-mounted gears upon the shaft. Fig. 7 is a section through one of said gears, showing a modified means for preventing rotation thereof in one direction; and Fig. 8 is a side elevation of a portion of a modified form of screw-shaft. Fig. 9 is a transverse section through the rod and its sleeve.

Referring to the figures by numerals of reference, 1 is a handle of a fishing-rod 2, and said rod and handle are secured in any suitable manner to the opposite ends of a tubular casing 3, having a longitudinally-extending slot 4 therein. A plug 5 is mounted within one end of casing 3, and a pair of plugs 6 are secured within the casing near the opposite end thereof. The smooth ends 7 and 8 of a screw-shaft 9 are journaled within the plugs 5 and 6, respectively, and the end 7 of said shaft is preferably mounted in roller-bearings, as illustrated at 10. A block 11 is mounted upon the threaded portion 9 of the shaft and extends through the slot 4 and is connected in any suitable manner to the inner surface of a sleeve 12, which is slidably mounted upon casing 3. The end 8 of shaft 9 has ratchet-wheels 13 secured thereto and revoluble therewith. Each of these wheels is inclosed by a cylindrical casing 14, secured to and extending longitudinally from the rear end of a beveled gear 15. The ratchet-wheels are oppositely disposed, and each is engaged by a plate 17, having a spring 16 fastened thereon and bearing upon the casing 14. It is therefore obvious that when the shaft 9 is turned in one direction by one of the ratchet-wheels 13 it will be engaged by this pawl. The two gears 15 mesh with and are arranged at opposite sides of a beveled gear 18, which is secured to the inner end of a laterally-extending shaft 19. This shaft is held in position within the side of casing 3 by a screw-plug 20, having a tubular extension 21 projecting from the center of its outer end and inclosed by a coiled spring 22. This spring bears at opposite ends upon plug 20 and upon a shoulder 23, formed within a sleeve 24, having a flange 25 at the lower edge thereof. A pin 26 extends transversely through the outer end of sleeve 24 and projects through a longitudinal slot 27 within shaft 19. Teeth 28 are arranged at the outer end of sleeve 24 and are adapted to normally engage the toothed inner end of a plug 29, which is externally screw-threaded and is detachably secured within the threaded bore 30 of a line-reel 31. The outer end of shaft 19 is reduced in diameter, as shown at 32, and projects through the plug 29 and forms a bearing therefor. The shoulder 33, formed at the inner end of the reduced portion of shaft 19, serves to prevent the reel and its plug 29 from moving longitudinally upon said shaft, and a cap 34 is arranged upon the outer end of said reel and is detachably secured to the threaded end 35 of the reduced portion 32. The reel is thus held securely upon the shaft 19, but cannot move longitudinally thereon in either direction. A ring 36 incloses sleeve 24 and bears upon the flange 25. This ring has an arm 37, which extends down to one side of casing 3 and is pivoted to one end of a lever 38, having a knob 39, whereby the same may be readily swung upon its fulcrum. The inner end of the periphery of the reel 31 is grooved, as shown at 40, and a spring-strip 41 is secured at one end to the handle 1, while the other end thereof projects into the groove. The pressure of said spring upon the side of the groove may be regulated by a set-screw 42. When it is desired to draw in the line, sleeve 12 is reciprocated upon casing 3, and as block 11, which moves therewith, cannot turn it will in moving from end to end of the threaded portion 9 of the shaft cause said shaft to revolve back and forth. In view of the novel arrangement of ratchet-wheels 13 and pawls 16 the two gears 15 will, as hereinbefore stated, revolve in the same direction alternately, and therefore the reel 31 will be rotated continuously in one direction when the sleeve is reciprocated. When it is desired to play out the line, the knob 39 is drawn toward the reel and causes ring 36 to pull sleeve 24 toward the casing. This will release the teeth 28 from engagement with the plug 29, and the reel will be free to revolve. When the lever 38 is released, the spring 22, which is compressed when the sleeve 24 is restricted, will promptly return said sleeve to its normal position. The strip 41 can be forced against the side of groove 40 with any desired degree of pressure by means of screw 42, and by means of this strip the unwinding of the reel may be retarded.

In Fig. 7 we have shown a clutching device which may be employed in lieu of the pawl-and-ratchet mechanism hereinbefore referred to. This clutch comprises a cam 43, which is secured to the end 8 of the shaft and has balls 44 interposed between the periphery and the inner surface of the cylindrical casing 14. The cam is so shaped that when it is turned in one direction the balls will be free to roll upon the inner surface of casing 14; but when the revolution of said cams is reversed the balls will be wedged between it and the casing and the gear upon the casing caused to revolve therewith. Also instead of providing a screw-shaft such as illustrated in Fig. 3, and which is preferably formed by twisting the metal, we may, if desired, cut a spiral thread 45 in the shaft, as illustrated in Fig. 8.

In the foregoing description we have shown the preferred form of our invention; but we do not limit ourselves thereto, as we are aware that modifications may be made therein without departing from the spirit or sacrificing any of the advantages of our invention, and we therefore reserve the right to make such changes and alterations as may fairly fall within the scope thereof.

Having thus described the invention, what is claimed as new, and desired to be secured by Letters Patent, is—

1. In a fishing-rod the combination with a tubular casing having a slot therein; of a screw-shaft journaled within the casing, a sleeve slidably mounted upon the casing and engaging said shaft, a toothed sleeve outside the casing, means for imparting motion thereto in one direction from the shaft when rotated in either direction, a reel inclosing the sleeve and adapted to be engaged thereby, and means for retracting the sleeve from engagement with the reel.

2. In a fishing-rod the combination with a tubular casing having a longitudinally-extending slot therein; of a screw-shaft journaled within the casing, a sleeve slidable upon the casing and engaging the shaft, a reel having a groove in the periphery thereof, means for rotating said reel in one direction from the shaft when rotated in opposite directions, a spring-strip upon the rod and projecting into the groove in the reel, and means for tensioning said strip.

3. In a fishing-rod the combination with a tubular casing having a slot therein; of a screw-shaft journaled within the casing, a sleeve slidable upon the casing and engaging said shaft, oppositely-disposed gears upon the shaft, means for rotating the gears in opposite directions alternately, a plug within the casing, a shaft journaled therein, a gear at the inner end of the shaft and meshing with the first-mentioned gears, a spring-pressed sleeve slidable upon said shaft, teeth thereon, a reel revolubly mounted upon the shaft and sleeve and adapted to be engaged by said teeth and means for retracting the teeth from engagement with the reel.

4. The combination with a fishing-rod; of a reel mounted thereon and having a groove therein adjacent to its inner end, a spring-strip secured to the rod and projecting into the groove, and means for regulating the pressure of said strip upon the side of the groove.

In testimony whereof we affix our signatures in presence of two witnesses.

ALLEN E. HALL.
WM. G. SMITH.

Witnesses:
JESSE GILBERT,
ALBERT E. MILLER.